United States Patent
Czajkowski

(10) Patent No.: US 11,256,836 B2
(45) Date of Patent: Feb. 22, 2022

(54) TOGGLE RATE REDUCTION IN HIGH LEVEL PROGRAMMING IMPLEMENTATIONS

(71) Applicant: Intel Corporation, Santa Clara, CA (US)

(72) Inventor: Tomasz Czajkowski, Toronto (CA)

(73) Assignee: Intel Corporation, Santa Clara, CA (US)

(*) Notice: Subject to any disclaimer, the term of this patent is extended or adjusted under 35 U.S.C. 154(b) by 923 days.

(21) Appl. No.: 15/842,311

(22) Filed: Dec. 14, 2017

(65) Prior Publication Data

US 2019/0042673 A1  Feb. 7, 2019

(51) Int. Cl.
*G06F 30/327* (2020.01)
*G06F 30/34* (2020.01)
*G06F 119/06* (2020.01)

(52) U.S. Cl.
CPC ............ *G06F 30/327* (2020.01); *G06F 30/34* (2020.01); *G06F 2119/06* (2020.01)

(58) Field of Classification Search
USPC .......................................................... 716/101
See application file for complete search history.

(56) References Cited

U.S. PATENT DOCUMENTS 6,105,139 A * 8/2000 Dey .......................... G06F 1/32
713/300
7,555,741 B1 * 6/2009 Milton .................... G06F 30/34
716/101

* cited by examiner

*Primary Examiner* — Bryce M Aisaka
(74) *Attorney, Agent, or Firm* — Fletcher Yoder, PC

(57) ABSTRACT

Power dissipation in integrated circuits may be reduced by efficient implementation of high level programming on the integrated circuits. As the high level programming logic is implemented on the integrated circuits, data inputs are disabled based upon branches and/or data that is not used by the high level programming.

12 Claims, 4 Drawing Sheets

TOGGLE RATE REDUCTION IN HIGH LEVEL PROGRAMMING IMPLEMENTATIONS

BACKGROUND

The present disclosure generally relates to integrated circuit devices and, more particularly, to reducing power dissipation in an integrated circuit device by efficient implementation of high level programming on the integrated circuit device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, power dissipation is an unwanted byproduct of a primary action of an integrated circuit device where the integrated circuit device produces heat/waste energy. This power dissipation may result in increased power consumption/costs. For example, dynamic power dissipation may be defined as the product of toggle rate t, clock frequency f, voltage V and load capacitance C. The formula that governs the total dynamic power is:

$$\frac{1}{2}\sum_{i=1}^{N} Vft_iC_i$$

where N is the total number of nets, including nets between transistors in a CMOS design as well as net connecting logic gates and other components to one another.

Oftentimes, as high-level designs are implemented in the logic area of a programmable integrated circuit device, the implementation does not effectively reduce power dissipation, especially considering the multi-threaded languages that are oftentimes used. These inefficiencies cause undesirable power consumption during normal operation of a design implemented on the programmable integrated circuit device.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, embodiments of the present disclosure relate generally to power-efficient implementation of high-level design features on programmable integrated circuit devices. More specifically, enhanced implementations of high-level programming features may result in reduced toggle-rate on the integrated circuit, such that power dissipation is decreased. As mentioned above, dynamic power dissipation may be defined as the product of toggle rate t, clock frequency f, voltage V and load capacitance C. The formula that governs the total dynamic power is:

$$\frac{1}{2}\sum_{i=1}^{N} Vft_iC_i$$

where N is the total number of nets, including nets between transistors in a CMOS design as well as net connecting logic gates and other components to one another. Accordingly, by reducing the toggle rate t, the overall power dissipation may be reduced, resulting in more efficient utilization of power during normal operation of the integrated circuit device.

Figure 1:
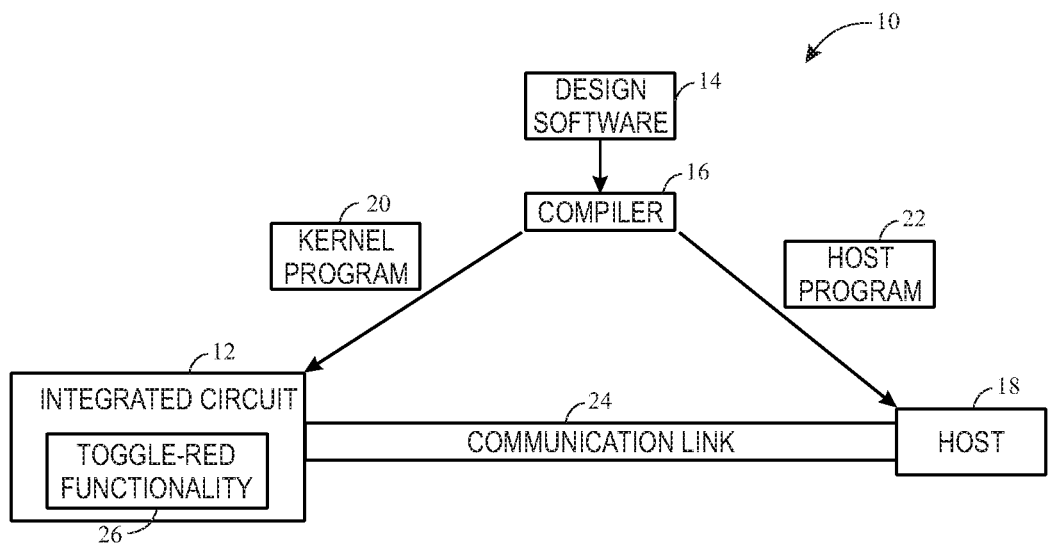
FIG. 1 is a block diagram of a system that utilizes toggle-rate reduced designs, in accordance with an embodiment.

With the foregoing in mind, FIG. 1 illustrates a block diagram of a system 10 that utilizes enhanced high-level programming implementations for power-efficient operation of the IC 12. In order to implement a set of programmable logic for the IC 12, the designer may implement high level designs using design software 14, such as a version of Quartus by Intel™ The design software 14 may use a compiler 16 to convert the high level program into a low level program. The compiler 16 may provide machine-readable instructions representative of the high level program to a host 18 and the IC 12. For example, the IC 12 may receive one or more kernel programs 20 which describe the hardware implementations that should be stored in the IC. The host 18 may receive a host program 22 which may be implemented by the kernel programs 20. To implement the host program 22, the host 18 may communicate instructions from the host program 22 to the IC 12 via a communications link 24, which may be, for example, direct memory access (DMA) communications or peripheral component interconnect express (PCIe) communications. In some embodiments, the kernel programs 20 and the host 18 may enable toggle-reduced functionality 26 based upon the designs provided via the design software 14. For example, the compiler 16 may generate efficient implementations that reduce an amount of toggling, ultimately reducing power dissipation in the integrated circuit 12. The toggle-reduced functionality 26 may be implemented on the IC 12 and controlled by the host 18.

Figure 2:
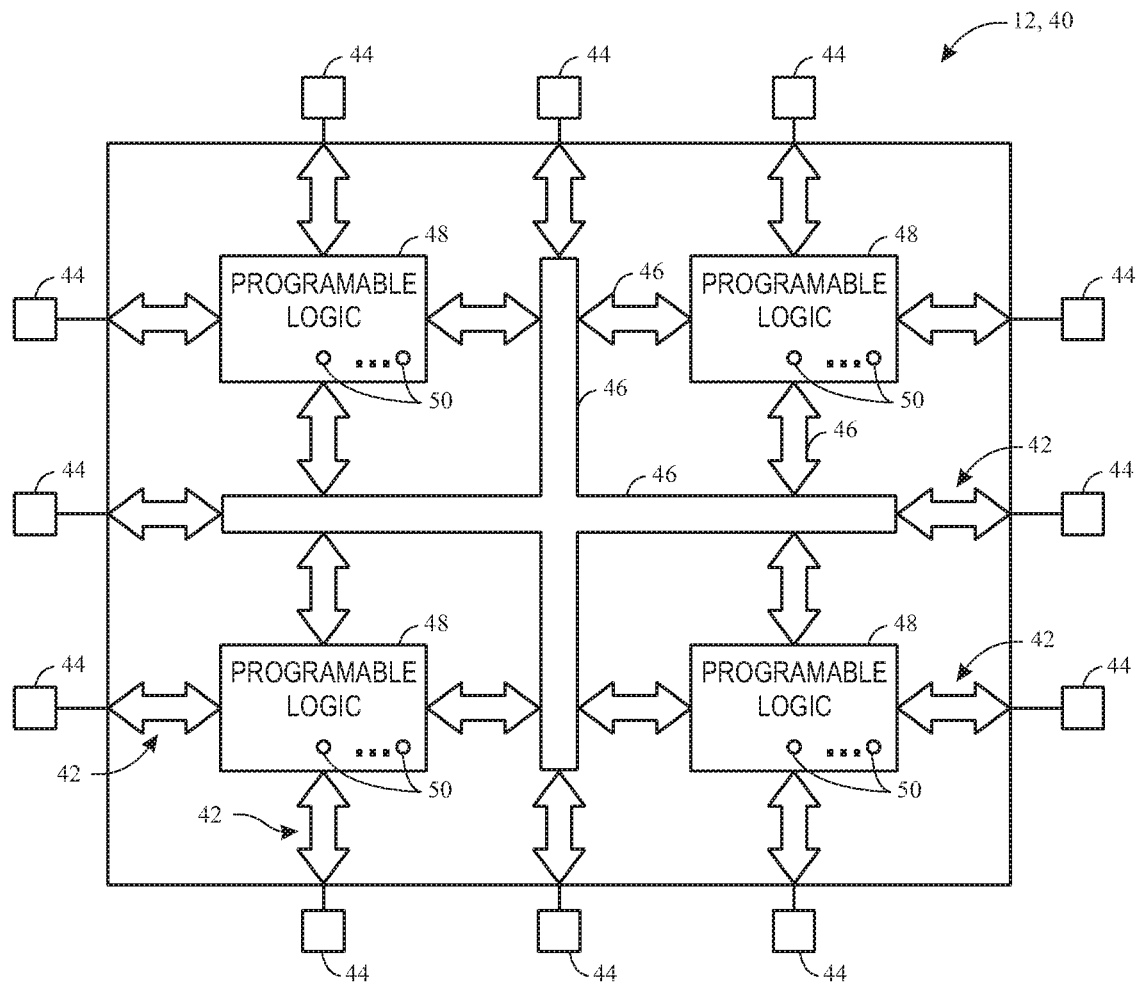
FIG. 2 is an integrated circuit device (e.g., FPGA), which may be configured to implement toggle-rate reduced designs, in accordance with an embodiment.

Turning now to a more detailed discussion of the IC 12, FIG. 2 illustrates an IC device 12, which may be a programmable logic device 40. The programmable logic device 40 may be any device that implements programming of a high-level language, such as a field programmable gate array (FPGA), an application-specific integrated circuit (ASIC), and/or application-specific standard product (ASSP). As shown, programmable logic device 40 may have input/output circuitry 42 for driving signals off of programmable logic device 40 and for receiving signals from other devices via input/output pins 44. Interconnection resources 46, such as global and local vertical and horizontal conductive lines and buses, may be used to route signals on programmable logic device 40. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48.

Programmable logic devices, such as programmable logic device 40, may contain programmable elements 50 with the programmable logic 48. For example, as discussed above, a designer (e.g., a customer) may program (e.g., configure) the programmable logic 48 to perform one or more desired functions, such as QR decomposition. By way of example, some programmable logic devices may be programmed by configuring their programmable elements 50 using mask programming arrangements, which is performed during semiconductor manufacturing. Other programmable logic devices are configured after semiconductor fabrication operations have been completed, such as by using electrical programming or laser programming to program their programmable elements 50. In general, programmable elements 50 may be based on any suitable programmable technology, such as fuses, antifuses, electrically-programmable read-only-memory technology, random-access memory cells, mask-programmed elements, and so forth.

The circuitry of programmable logic device 40 may be organized using any suitable architecture. As an example, the logic of programmable logic device 40 may be organized in a series of rows and columns of larger programmable logic regions, each of which may contain multiple smaller logic regions. The logic resources of programmable logic device 40 may be interconnected by interconnection resources 46 such as associated vertical and horizontal conductors. For example, in some embodiments, these conductors may include global conductive lines that span substantially all of programmable logic device 40, fractional lines such as half-lines or quarter lines that span part of programmable logic device 40, staggered lines of a particular length (e.g., sufficient to interconnect several logic areas), smaller local lines, or any other suitable interconnection resource arrangement. Moreover, in further embodiments, the logic of programmable logic device 40 may be arranged in more levels or layers in which multiple large regions are interconnected to form still larger portions of logic. Still further, other device arrangements may use logic that is arranged in a manner other than rows and columns.

As mentioned above, toggle-reduced functionality may be implemented on the IC 12. This functionality may perform various features of the high-level design, while attempting to minimize/reduce toggling of components in the IC, as the toggling may lead to increased power dissipation. The compiler 16 may take a high-level language (e.g., from the design software 14) and implement the described algorithm in hardware on a platform such as an FPGA (e.g., IC 12). By implementing toggle-reduced functionality for the described high-level functionality, the toggle rate may be directly modified at design time. This linearly impacts the dynamic power and is a powerful tool in managing the power budget of a design.

The techniques described herein implement toggle-reduced functionality by disabling data inputs when a branch and/or data associated with the inputs is not used. For example, these techniques disable some registers on inputs to mutually exclusive paths of computation, selectively disable registers on inputs to inactive basic blocks, and/or enhance stallable registers to prevent data from toggling on invalid data transitions. These techniques may result in significant power savings during operation of the IC 12.

In particular, the technique to reduce power in multi-threaded logic circuits may include If-then-else optimization, Merge node masking, and stallable register data retention. While the techniques described herein can be used together or separately to reduce the average toggle rate of a design, it is important to note that in multi-threaded algorithms implemented in hardware, these techniques can have a very large impact even if they are applied only to a very select subset of the entire design. This is because in such designs, which tend to be highly pipelined, reducing toggle rates early in the pipeline transitively reduces the toggle rate within the logic circuit overall. This makes these techniques highly effective in power dissipation reduction.

i. If-then-Else Optimization

Figure 3:
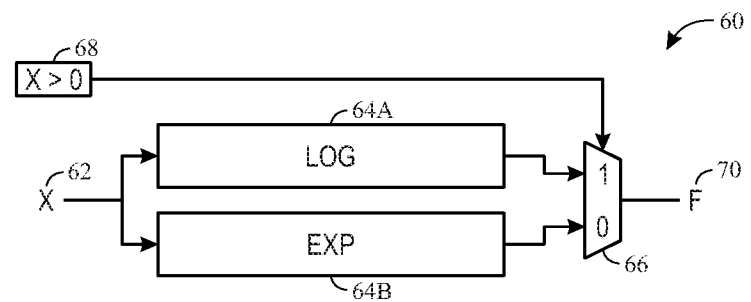
FIG. 3 is a schematic diagram illustrating circuitry for implementing if-then-else logic, in accordance with an embodiment.

The discussion of the toggle-reducing functionality begins with If-then-else optimization. In software programs, if-then-else clauses occur frequently. In hardware, supporting multi-threaded operation, the implication is that at each clock cycle it is possible that both branches are executing, just for different threads. This costs hardware and requires in the simplest terms for every branch to be evaluated for each thread and the result be selected between the available branches upon completion. FIG. 3 is a schematic diagram of circuitry 60 for an if-then-else implementation, where every branch of the statement is evaluated.

Circuitry 60 implements the following high-level language if-then-else statement:

```
if (x > 0) {
    f = log(x);
} else {
    f = exp(x);
}
```

X is the input, Log(x) and Exp(x) represent the branches, and x>0 is the condition that determines which output from the branches is selected. Accordingly, as depicted in the circuitry 60 of FIG. 3, the x input 62 is provided to the branch processing pipelines 64A (e.g., log processing) and 64B (e.g., exp processing). The outputs of the branch processing pipelines 64A and 64B are provided to a multiplexer 66, which uses the x>0 condition 68 as a selector signal for the multiplexer 66. Accordingly, the multiplexer selects the output from branch processing pipeline 64A when x>0 and selects the output from branch processing pipeline 65B when x<=0, resulting in the f output 70.

In the implementation of FIG. 3 both branch processing pipelines 64A and 64B are always evaluated and once both branch processing pipelines 64A and 64B are evaluated, only one of the outputs is selected. Accordingly, one of the branch processing pipelines 64A or 64B is using power to make an evaluation that is not used.

Figure 4:
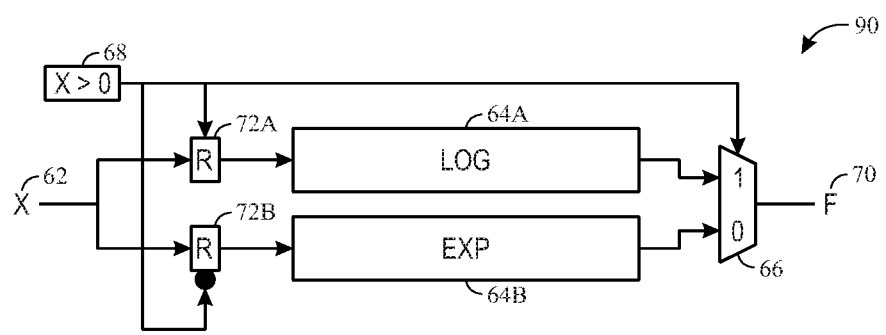
FIG. 4 is a schematic diagram illustrating circuitry for implementing power-reduced if-then-else functions, in accordance with an embodiment.

To increase power efficiency, a modified if-then-else representation may be implemented in the IC 12. FIG. 4 is a schematic diagram of circuitry 90 that implements power-reduced if-then-else functions, in accordance with an embodiment. The circuitry 90 uses a complementary output of the condition to selectively enable registers, which may result in reduced power usage. For example, in the embodiment of FIG. 4, the x input 62, the branch processing pipelines 64A and 64B, the multiplexer 66, the condition 68, and the f output 70 are the same. However, to reduce power usage on branch processing pipelines (e.g., 64A and/or 64B) that are not in use, the x input 62 may be registered prior to entering either of the branch processing pipelines 64A and 64B (e.g., in R register 72A and S register 72B, respectively). Since it is know that the condition will only result in one of the branch processing pipelines 64A or 64B being used, the R register 72A and the S register 72B may be enabled on complementary outputs of the condition 68 (e.g., x>0). Thus, the R register 72A is enabled when x>0 and the S register 72B is enabled when x<=0. Accordingly, only one of the R register 72A or the S register 72B is enabled, resulting in only one of these pathways receiving data to evaluate.

Because the other pathway does not receive a data input, it does not evaluate data and, therefore, results in significant toggle rate reduction in the unused branch. For example, in the embodiment of FIG. 3, the circuit 60 consumes $P_{log}+P_{exp}+P_{max}+P_{cmp}$ dynamic power. In contrast, in the embodiment of FIG. 4, given that P[x>0] is probability that x>0, then dynamic power is $P[x>0]*(P_{log}+P_{reg\_R})+(1-P[x>0])*(P_{exp}+P_{reg\_S})+P_{max}+P_{cmp}$. As an example of power reduction, suppose that P[x>0]=0.5, $P_{exp}=P_{log}=1$ W, $P_{cmp}=P_{max}=0.05$ W, $P_{reg\_S}=P_{reg\_R}=0.05$ W, then dynamic power is reduced by ~45% (1.15/2.1)

Figure 5:
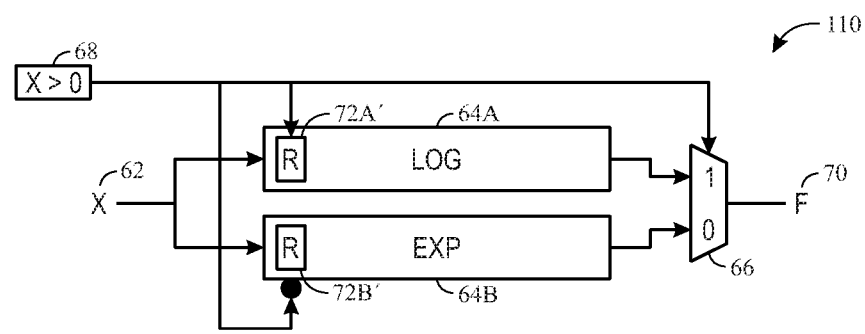
FIG. 5 is a schematic diagram of enhanced power-saving circuitry, in accordance with an embodiment.

FIG. 5 is an embodiment of enhanced power-saving circuitry 110, where existing registers are used to implement the power-saving features of register enablement via complementary conditional outputs, in accordance with an embodiment. The circuitry 110 implements the R register 72A and the S register 72B, but does so using stages of registers 72A' and 72B' that are part of the existing branch processing pipelines 64A and 64B, resulting in reduced logic that is used for implementing the power-saving techniques discussed herein.

To select the stages of registers 72A' and 72B', the compiler may select a stage of registers that maximizes the reduction of power in the downstream logic. For example, as illustrated, the R stage of registers 72A' are further upstream than the S stage of registers 72B'. By placing the stage of registers further upstream in the branch processing pipelines 64A and 64B, the reduced power effect may increase as more and more downstream components are not used. However, the compiler may take into account other considerations that may result in the most upstream registers not being selected. For example, the compiler may attempt to minimize the impact of adding an enable line to the stage of registers, by finding a stage of registers where fewer enable lines are needed. Accordingly, as depicted in FIG. 5, neither the R stage of registers 72A' nor the S stage of registers 72B' are in the upper-most position, but instead are balanced based upon attempting to minimize the impact of adding an enable line to the stages of registers.

ii. Merge Node Masking

Algorithms described in high-level languages such as C end up implemented as segments of branch-free code, called basic blocks. In hardware, each basic block has a merge node which stores data for computation to be performed by the basic block. This data changes at each clock cycle in a multi-threaded implementation of the algorithm.

However, it is not always the case that a basic block is doing work. Sometimes, basic block modules wait for predecessor or successor basic block modules to finish computation. However, it is very easy for data to flow from one basic block to another and dissipate power. Masking unwanted transitions could alleviate the problem and thus reduce average dynamic power dissipated by a circuit. Accordingly, power-enhanced implementations may be automatically implemented via a high-level design compiler.

Figure 6:
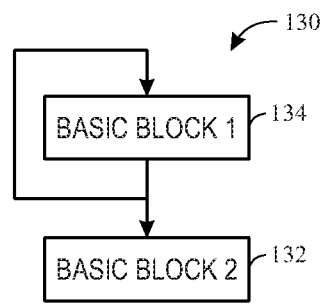
FIG. 6 is a schematic diagram of a basic block data transfer, in accordance with an embodiment.

For example, FIG. 6 illustrates a schematic diagram of a basic block data transfer 130. In the basic block data transfer 130, Basic Block 2 132 snoops data at the output of Basic Block 1 134 on every clock cycle. This data migrates to the datapath in Basic Block 2 and undergoes computation that may be discarded (e.g., when the only output the logic is concerned with is the last loop of Basic Block 1 134. Accordingly, power efficiency may be enhanced by reducing data transfer to Basic Block 2 132 until the data that will actually be used is ready (e.g., until after the last loop of the Basic Block 1 134).

Figure 7:
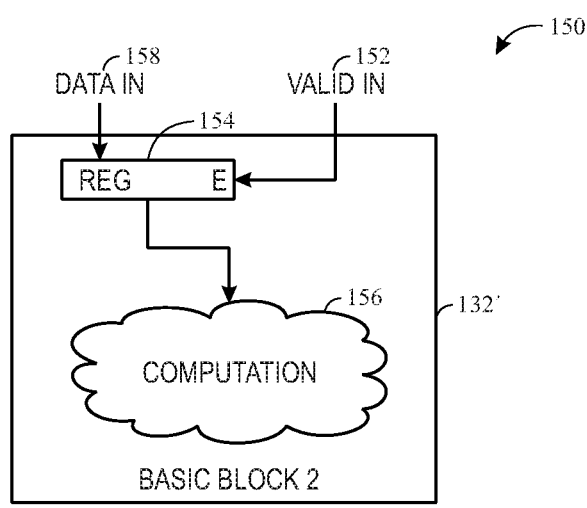
FIG. 7 is an illustration of circuitry to be added to a basic block to reduce power computation by receiving only valid data, in accordance with an embodiment.

FIG. 7 is an illustration of circuitry 150 that may be added to a basic block, which reduces power consumption by receiving only valid data, in accordance with an embodiment. For example, the current embodiment depicts a modified Basic Block 2 132', which is a power efficient version of Basic Block 2 132 of FIG. 6.

The modified Basic Block 2 132' masks data changes until basic block computation is triggered by a valid signal 152. For example, returning to the example provided in FIG. 6, the valid signal 152 is trigged upon execution and/or completion of the last loop of Basic Block 1 134. As illustrated, a data register 154 is placed upstream of the computation logic 156. The register 154 masks data transitions from previous basic block (e.g., Basic Block 1 134 of FIG. 6) and is only enabled when Basic Block 2 132' computation logic 156 is triggered by the valid signal 152.

In other words, the data register 154 registers data from the data input 158 only when the valid signal 152 is enabled (e.g., when the last loop of Basic Block 1 134 of FIG. 6 is executing/complete). Accordingly, when the valid signal 152 is not enabled (e.g., when not on the last loop of the Basic Block 1 134 of FIG. 6), data is not registered and, thus, the computation logic 156 does not evaluate any incoming data. This dynamic enabling of the computation logic 156 may result in significant power savings.

In multi-threaded implementations of algorithms on FPGAs, registers may be plentiful. Therefore, it may not necessary to add new registers as long as existing registers whose enable input could be utilized for the described purposes can be found. Logic to generate the enable signal is very simple and in most cases can be implemented within existing lookup tables in a given design.

Another benefit of using registers for filtering transitions in this context is that they gracefully shut down the circuit on an IC once it finishes computation. Without such mechanisms, it is possible for a circuit to continue performing meaningless computation on data it just processed and thus continuously consume energy.

iii. Stallable Register Data Retention

Figure 8:
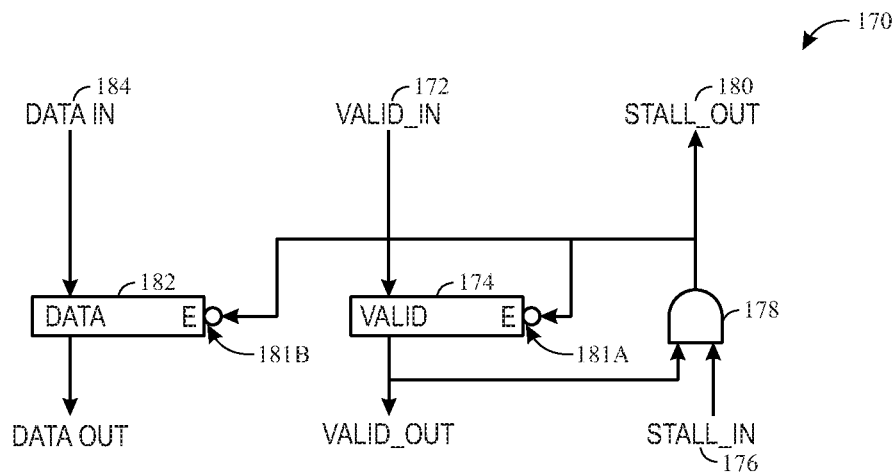
FIG. 8 is an illustration of stall-valid circuitry used to signify when data in registers can move from one stage to the next, in accordance with an embodiment.

In high-level programming designs (e.g., OpenCL designs), portions of the datapath may be stallable. This means that the circuit may need to halt execution while it waits for an operation (e.g., a memory read) to complete. This is implemented using stall-valid logic, which signifies when data in registers can move from one stage to the next. FIG. 8 illustrates stall-valid logic circuitry 170.

In the stall-valid logic circuitry 170, the valid signal 172 is registered at the valid register 174. The valid signal 172 provides an indication of whether the current data is valid data. A stall signal 176 indicates whether a stall has been triggered (e.g., because the pipeline is waiting for an operation to complete). In the stall-valid logic circuitry 170 the registered valid signal 172 and the stall signal in 176 are processed through an AND gate 178, resulting in a stall out signal 180. The stall out signal 180 is inverted and used as a register enable signal for the register enable 181A at the valid register 174 and a register enable signal for the register enable 181B at the data register 182. Accordingly, the valid register 174 and the data register 182 will register data from the valid signal 172 and the data in signal 184, respectively, at all times except when both the current data is valid and the stall in signal 176 is asserted.

As may be appreciated, there are additional scenarios where stalling may be used that are not covered by the stall-valid logic circuitry 170 of FIG. 8. For example, to reduce the frequency of data changes (especially when the datapath of an algorithm is temporarily unused), the stall-valid logic circuitry 170 may be expanded to only enable the data register 182 when the valid signal 172 is asserted, stalling when the valid signal 172 is not asserted.

Figure 9:
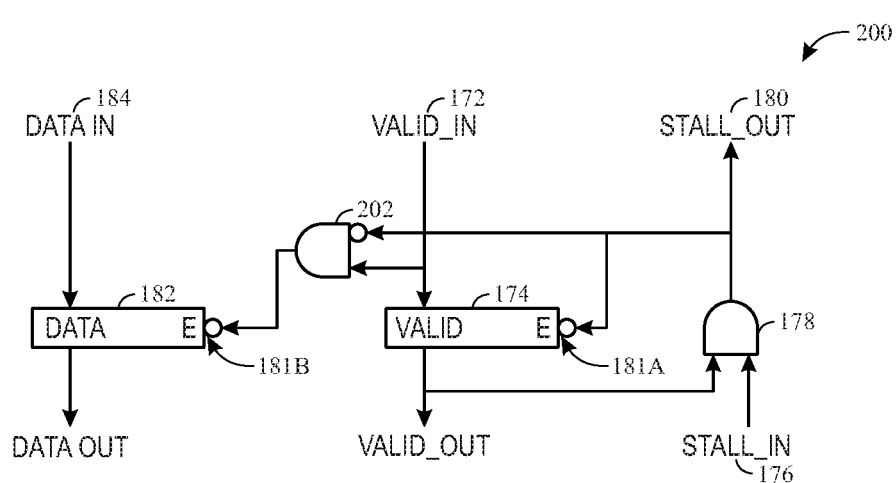
FIG. 9 is a schematic diagram of enhanced stall-valid circuitry, in accordance with an embodiment.

FIG. 9 is a schematic diagram of such enhanced stall-valid logic circuitry 200. The enhanced stall-valid logic circuitry 200 includes the same hand-shaking protocol in terms of the logic for stall/valid signals, except that the data register 182 is only enabled when the valid signal 172 is asserted. To implement this enhancement, a new AND gate 202 is implemented between data register 182 enable 181B and the stall out signal 180. As in the embodiment, of FIG. 8, the stall out signal 180 is inverted and provided as an input to the AND gate 202. The valid signal 172 is also provided as an input to the AND gate 202. The output of the AND gate 202 as provided as an enable signal for the data register 182. Accordingly, in the enhanced stall-valid logic circuitry 200, the data register is only enabled when the valid signal 172 is asserted. Further, while AND gate 202 is added, it may be possible to absorb the AND gate into a lookup table that implements the inverter. This enhanced stall-valid logic circuitry 200 permits data to change less frequently, especially when the datapath of an algorithm is temporarily unused.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

Embodiments of the Current Application

The following numbered clauses define embodiments of the current application.

Clause A1. A tangible, non-transitory, machine-readable medium, comprising machine-readable instructions that, when executed by one or more processors, cause the processors to:
  receive a high-level design;
  determine a circuitry implementation of the high-level design to be implemented on an integrated circuit; and
  cause implementation of the circuitry implementation of the high-level design on the integrated circuit;
  wherein the circuitry implementation of the high-level design comprises toggle-rate reduced circuitry that reduces a toggle rate of the circuitry implementation by blocking unused data from transitioning to downstream evaluation circuitry.

Clause A2. The machine-readable medium of clause A1, comprising machine-readable instructions that, when executed by the one or more processors, cause the processors to:
  identify an if-then else statement in the high-level design; and
  cause the circuitry implementation to include:
  a first data register that registers input data for a first branch processing pipeline of the if-then else statement;
  a second data register that registers input data for a second branch processing pipeline of the if-then else statement; and
  an enable signal for the first data register that is defined by the a condition of the if-then else statement being true; and
  an enable signal for the second data register that is defined by the condition of the if-then else statement being false.

Clause A3. The machine-readable medium of clause A2, comprising machine-readable instructions that, when executed by the one or more processors, cause the processors to:
  select a first stage of registers of the first branch processing pipeline as the first data register; and
  select a second stage of registers of the second branch processing pipeline as the second data register.

Clause A4. The machine-readable medium of clause A3, comprising machine-readable instructions that, when executed by the one or more processors, cause the processors to:
  select the first stage of registers, the second stage of registers, or both, to:
  maximize a reduction of power in the downstream evaluation circuitry of the first branch processing pipeline, the second branch processing pipeline, or both;
  minimize an impact of adding an enable line to the first stage of registers; or
  balance between maximizing the reduction of power in the downstream evaluation circuitry of the first branch processing pipeline, the second branch processing pipeline, or both, and minimizing the impact of adding an enable line to the first stage of registers.

Clause A5. The machine-readable medium of clause A3, comprising machine-readable instructions that, when executed by the one or more processors, cause the processors to:

identify a loop in the high-level design, the loop comprising a loop of a first basic block, where an output of a final iteration of the loop comprises an input to be evaluated in a second basic block; and cause the circuitry implementation to include, in the second basic block:
  a data register that registers input data for the second basic block prior to computation logic of the second basic block;
  an enable signal for the data register that is asserted when in the final iteration of the loop; and
  an enable signal for the second data register that is not asserted when in an iteration other than the final iteration of the loop.

Clause A6. The machine-readable medium of clause A1, comprising machine-readable instructions that, when executed by the one or more processors, cause the processors to:

identify where stall-valid logic circuits will be added to the circuitry implementation; and at locations in the circuitry implementation where stall-valid logic circuits will be added to the circuitry implementation, cause the stall-valid logic circuits to include an AND gate that:
  receives as inputs a valid signal and an inverted stall out signal; and
  provides an output that is used as an enable signal for a data register.

Clause A7. An integrated circuit device, comprising:
  an upstream data source;
  data utilization logic downstream of the upstream data source; and
  downstream evaluation circuitry of the data utilization logic;
  wherein the data utilization logic comprises toggle-rate reduced logic that reduces a toggle rate of the data utilization logic by blocking unused data from transitioning through the data utilization logic to the downstream evaluation circuitry.

Clause A8. The integrated circuit device of clause A7, wherein the data utilization logic comprises an implementation of an if-then-else statement; and
  wherein the toggle rate reduced logic reduces a toggle rate of the implementation of the if-then else statement on the integrated circuit device.

Clause A9. The integrated circuit device of clause A8, comprising:
  a first branch processing pipeline;
  a second branch processing pipeline;
  a first data register that registers input data for the first branch processing pipeline;
  a second data register that registers input data for the second branch processing pipeline;
  wherein the first data register and the second data register are enabled based upon a condition of the if-then-else statement.

Clause A10. The integrated circuit device of clause A9, wherein:
  one but not both of the first data register and the second data register are enabled based upon the condition being true; and
  wherein one but not both of the first data register and the second data register are enabled based upon the condition being false.

Clause A11. The integrated circuit device of clause A9, wherein:
  the first data register comprises a first stage of registers of the first branch processing pipeline; and
  the second data register comprises a second stage of registers of the second branch processing pipeline.

Clause A12. The integrated circuit device of clause A11, wherein:
  the first stage of registers, the second stage of registers, or both are positioned to maximize a reduction of power in the downstream evaluation circuitry of the first branch processing pipeline, the second branch processing pipeline, or both.

Clause A13. The integrated circuit device of clause A1, wherein:
  the first stage of registers, the second stage of registers, or both are positioned to minimize an impact of adding an enable line to the first stage of registers.

Clause A14. The integrated circuit device of clause A11, wherein:
  the first stage of registers, the second stage of registers, or both are positioned to balance between:
    maximizing a reduction of power in the downstream evaluation circuitry of the first branch processing pipeline, the second branch processing pipeline, or both; and
    minimizing an impact of adding an enable line to the first stage of registers.

Clause A15. The integrated circuit device of clause A7, wherein the data utilization logic comprises an implementation of a loop output; and
  wherein the toggle rate reduced logic reduces a toggle rate of the implementation of the loop output on the integrated circuit device.

Clause A16. The integrated circuit device of clause A15, comprising:
  a first basic block;
  a second basic block;
  looping logic that loops processing in the first basic block to produce the loop output;
  wherein the second basic block comprises validation logic to only receive the loop output upon execution, completion, or both of a last loop of the looping logic.

Clause A17. The integrated circuit device of clause A16, wherein the validation logic comprises a data register that is disposed upstream of computation logic of the second basic block, wherein the data register is enabled by a valid signal upon execution, completion, or both of the last loop of the looping logic, such that data may be registered in the data registered and subsequently evaluated by the computation logic, while blocking data from being registered by the data register when not executing, completing, or both the last loop of the looping logic.

Clause A18. The integrated circuit device of clause A7, wherein the toggle rate reduced logic reduces a toggle rate of stall-valid logic that implements a stall in the integrated circuit device.

Clause A19. The integrated circuit device of clause A18, wherein the toggle rate reduced logic comprises an AND gate;
  wherein the AND gate takes as input an inverted stall out and a valid signal; and
  wherein the AND gate provides an output signal used to selectively enable and disable a data register.

Clause A20. A hardware implemented method, comprising:

performing, via an integrated circuit device, data processing using a circuitry implementation of a high-level programming design, wherein the circuitry implementation comprises toggle rate reduced logic configured to reduce a toggle rate of the circuitry implementation by blocking unused data from transitioning to downstream evaluation circuitry;

the toggle rate reduced logic comprising:
first and second data registers configured to register input data for first and second processing pipelines, respectively, the first and second processing pipelines implemented for an if-then else statement of the high-level design, wherein the first data register is enabled when a condition of the if-then else statement is true and the second data register being enabled when the condition is false;
a third data register disposed upstream of computation logic of a first basic block that is enabled upon reaching a last iteration of a loop of an upstream basic block that provides its output to be used as an input for the first basic block;
stall-valid logic circuitry that enables a fourth data register only when a valid signal is asserted and a stall out signal is not asserted; or
any combination thereof.

Clause B1. A tangible, non-transitory, machine-readable medium, comprising machine-readable instructions that, when executed by one or more processors, cause the processors to:
receive a high-level design;
determine a circuitry implementation of the high-level design to be implemented on an integrated circuit; and
cause implementation of the circuitry implementation of the high-level design on the integrated circuit;
wherein the circuitry implementation of the high-level design comprises toggle-rate reduced circuitry that reduces a toggle rate of the circuitry implementation by blocking unused data from transitioning to downstream evaluation circuitry.

Clause B2. The machine-readable medium of clause B1, comprising machine-readable instructions that, when executed by the one or more processors, cause the processors to:
identify an if-then else statement in the high-level design; and
cause the circuitry implementation to include:
a first data register that registers input data for a first branch processing pipeline of the if-then else statement;
a second data register that registers input data for a second branch processing pipeline of the if-then else statement; and
an enable signal for the first data register that is defined by the a condition of the if-then else statement being true; and
an enable signal for the second data register that is defined by the condition of the if-then else statement being false.

Clause B3. The machine-readable medium of clause B2, comprising machine-readable instructions that, when executed by the one or more processors, cause the processors to:
select a first stage of registers of the first branch processing pipeline as the first data register; and
select a second stage of registers of the second branch processing pipeline as the second data register.

Clause B4. The machine-readable medium of clause B3, comprising machine-readable instructions that, when executed by the one or more processors, cause the processors to:
select the first stage of registers, the second stage of registers, or both, to:
maximize a reduction of power in the downstream evaluation circuitry of the first branch processing pipeline, the second branch processing pipeline, or both;
minimize an impact of adding an enable line to the first stage of registers; or
balance between maximizing the reduction of power in the downstream evaluation circuitry of the first branch processing pipeline, the second branch processing pipeline, or both, and minimizing the impact of adding an enable line to the first stage of registers.

Clause B5. The machine-readable medium of clause B3, comprising machine-readable instructions that, when executed by the one or more processors, cause the processors to:
identify a loop in the high-level design, the loop comprising a loop of a first basic block, where an output of a final iteration of the loop comprises an input to be evaluated in a second basic block; and
cause the circuitry implementation to include, in the second basic block:
a data register that registers input data for the second basic block prior to computation logic of the second basic block;
an enable signal for the data register that is asserted when in the final iteration of the loop; and
an enable signal for the second data register that is not asserted when in an iteration other than the final iteration of the loop.

Clause B6. The machine-readable medium of clause B1, comprising machine-readable instructions that, when executed by the one or more processors, cause the processors to:
identify where stall-valid logic circuits will be added to the circuitry implementation; and
at locations in the circuitry implementation where stall-valid logic circuits will be added to the circuitry implementation, cause the stall-valid logic circuits to include an AND gate that:
receives as inputs a valid signal and an inverted stall out signal; and
provides an output that is used as an enable signal for a data register.

Clause B7. An integrated circuit device, comprising:
an upstream data source;
data utilization logic downstream of the upstream data source; and
downstream evaluation circuitry of the data utilization logic;
wherein the data utilization logic comprises toggle-rate reduced logic that reduces a toggle rate of the data utilization logic by blocking unused data from transitioning through the data utilization logic to the downstream evaluation circuitry.

Clause B8. The integrated circuit device of clause B7, wherein the data utilization logic comprises an implementation of an if-then-else statement; and
wherein the toggle rate reduced logic reduces a toggle rate of the implementation of the if-then else statement on the integrated circuit device.

Clause B9. The integrated circuit device of clause B8, comprising:
a first branch processing pipeline;

a second branch processing pipeline;
a first data register that registers input data for the first branch processing pipeline;
a second data register that registers input data for the second branch processing pipeline;
wherein the first data register and the second data register are enabled based upon a condition of the if-then-else statement.

Clause B10. The integrated circuit device of clause B9, wherein:
one but not both of the first data register and the second data register are enabled based upon the condition being true; and
wherein one but not both of the first data register and the second data register are enabled based upon the condition being false.

Clause B11. The integrated circuit device of clause B9, wherein:
the first data register comprises a first stage of registers of the first branch processing pipeline; and
the second data register comprises a second stage of registers of the second branch processing pipeline.

Clause B12. The integrated circuit device of clause B11, wherein:
the first stage of registers, the second stage of registers, or both are positioned to maximize a reduction of power in the downstream evaluation circuitry of the first branch processing pipeline, the second branch processing pipeline, or both.

Clause B13. The integrated circuit device of clause B11, wherein:
the first stage of registers, the second stage of registers, or both are positioned to minimize an impact of adding an enable line to the first stage of registers.

Clause B14. The integrated circuit device of clause B11, wherein:
the first stage of registers, the second stage of registers, or both are positioned to balance between:
maximizing a reduction of power in the downstream evaluation circuitry of the first branch processing pipeline, the second branch processing pipeline, or both; and
minimizing an impact of adding an enable line to the first stage of registers.

Clause B15. The integrated circuit device of clause B7, wherein the data utilization logic comprises an implementation of a loop output; and
wherein the toggle rate reduced logic reduces a toggle rate of the implementation of the loop output on the integrated circuit device.

Clause B16. The integrated circuit device of clause B15, comprising:
a first basic block;
a second basic block;
looping logic that loops processing in the first basic block to produce the loop output;
wherein the second basic block comprises validation logic to only receive the loop output upon execution, completion, or both of a last loop of the looping logic.

Clause B17. The integrated circuit device of clause B16, wherein the validation logic comprises a data register that is disposed upstream of computation logic of the second basic block, wherein the data register is enabled by a valid signal upon execution, completion, or both of the last loop of the looping logic, such that data may be registered in the data registered and subsequently evaluated by the computation logic, while blocking data from being registered by the data register when not executing, completing, or both the last loop of the looping logic.

Clause B18. The integrated circuit device of clause B7, wherein the toggle rate reduced logic reduces a toggle rate of stall-valid logic that implements a stall in the integrated circuit device.

Clause B19. The integrated circuit device of clause B18, wherein the toggle rate reduced logic comprises an AND gate;
wherein the AND gate takes as input an inverted stall out and a valid signal; and
wherein the AND gate provides an output signal used to selectively enable and disable a data register.

Clause B20. A hardware implemented method, comprising:
performing, via an integrated circuit device, data processing using a circuitry implementation of a high-level programming design, wherein the circuitry implementation comprises toggle rate reduced logic configured to reduce a toggle rate of the circuitry implementation by blocking unused data from transitioning to downstream evaluation circuitry;
the toggle rate reduced logic comprising:
first and second data registers configured to register input data for first and second processing pipelines, respectively, the first and second processing pipelines implemented for an if-then else statement of the high-level design, wherein the first data register is enabled when a condition of the if-then else statement is true and the second data register being enabled when the condition is false;
a third data register disposed upstream of computation logic of a first basic block that is enabled upon reaching a last iteration of a loop of an upstream basic block that provides its output to be used as an input for the first basic block;
stall-valid logic circuitry that enables a fourth data register only when a valid signal is asserted and a stall out signal is not asserted; or any combination thereof.

Clause C1. A tangible, non-transitory, machine-readable medium, comprising machine-readable instructions that, when executed by one or more processors, cause the processors to:
receive a high-level design;
determine a circuitry implementation of the high-level design to be implemented on an integrated circuit; and
cause implementation of the circuitry implementation of the high-level design on the integrated circuit;
wherein the circuitry implementation of the high-level design comprises toggle-rate reduced circuitry that reduces a toggle rate of the circuitry implementation by blocking unused data from transitioning to downstream evaluation circuitry.

Clause C2. The machine-readable medium of clause C1, comprising machine-readable instructions that, when executed by the one or more processors, cause the processors to:
identify an if-then else statement in the high-level design; and
cause the circuitry implementation to include:
a first data register that registers input data for a first branch processing pipeline of the if-then else statement;
a second data register that registers input data for a second branch processing pipeline of the if-then else statement; and an enable signal for the first data register that is defined by the a condition of the if-then else statement being true; and an enable signal for the second data register that is defined by the condition of the if-then else statement being false.

Clause C3. The machine-readable medium of clause C2, comprising machine-readable instructions that, when executed by the one or more processors, cause the processors to:

select a first stage of registers of the first branch processing pipeline as the first data register; and select a second stage of registers of the second branch processing pipeline as the second data register.

Clause C4. The machine-readable medium of clauses C3, comprising machine-readable instructions that, when executed by the one or more processors, cause the processors to:

select the first stage of registers, the second stage of registers, or both, to:

maximize a reduction of power in the downstream evaluation circuitry of the first branch processing pipeline, the second branch processing pipeline, or both;

minimize an impact of adding an enable line to the first stage of registers; or balance between maximizing the reduction of power in the downstream evaluation circuitry of the first branch processing pipeline, the second branch processing pipeline, or both, and minimizing the impact of adding an enable line to the first stage of registers.

Clause C5. The machine-readable medium of clauses C3 or 4, comprising machine-readable instructions that, when executed by the one or more processors, cause the processors to:

identify a loop in the high-level design, the loop comprising a loop of a first basic block, where an output of a final iteration of the loop comprises an input to be evaluated in a second basic block; and cause the circuitry implementation to include, in the second basic block:

a data register that registers input data for the second basic block prior to computation logic of the second basic block;

an enable signal for the data register that is asserted when in the final iteration of the loop; and an enable signal for the second data register that is not asserted when in an iteration other than the final iteration of the loop.

Clause C6. The machine-readable medium of clauses C1, 2, 3, or 4, comprising machine-readable instructions that, when executed by the one or more processors, cause the processors to:

identify where stall-valid logic circuits will be added to the circuitry implementation; and at locations in the circuitry implementation where stall-valid logic circuits will be added to the circuitry implementation, cause the stall-valid logic circuits to include an AND gate that:

receives as inputs a valid signal and an inverted stall out signal; and provides an output that is used as an enable signal for a data register.

Clause C7. An integrated circuit device, comprising:

an upstream data source;

data utilization logic downstream of the upstream data source; and downstream evaluation circuitry of the data utilization logic;

wherein the data utilization logic comprises toggle-rate reduced logic that reduces a toggle rate of the data utilization logic by blocking unused data from transitioning through the data utilization logic to the downstream evaluation circuitry.

Clause C8. The integrated circuit device of clause C7, comprising:

a first branch processing pipeline;

a second branch processing pipeline;

a first data register that registers input data for the first branch processing pipeline;

a second data register that registers input data for the second branch processing pipeline;

wherein the first data register and the second data register are enabled based upon a condition of the if-then-else statement;

wherein the data utilization logic comprises an implementation of an if-then-else statement;

wherein the toggle rate reduced logic reduces a toggle rate of the implementation of the if-then else statement on the integrated circuit device;

wherein one but not both of the first data register and the second data register are enabled based upon the condition being true;

wherein one but not both of the first data register and the second data register are enabled based upon the condition being false;

wherein the first data register comprises a first stage of registers of the first branch processing pipeline; and wherein the second data register comprises a second stage of registers of the second branch processing pipeline.

Clause C9. The integrated circuit device of clause C8, wherein:

the first stage of registers, the second stage of registers, or both are positioned to maximize a reduction of power in the downstream evaluation circuitry of the first branch processing pipeline, the second branch processing pipeline, or both.

Clause C10. The integrated circuit device of clauses C8 or 9, wherein:

the first stage of registers, the second stage of registers, or both are positioned to minimize an impact of adding an enable line to the first stage of registers.

Clause C11. The integrated circuit device of clauses C8 or 9, wherein:

the first stage of registers, the second stage of registers, or both are positioned to balance between:

maximizing a reduction of power in the downstream evaluation circuitry of the first branch processing pipeline, the second branch processing pipeline, or both; and minimizing an impact of adding an enable line to the first stage of registers.

Clause C12. The integrated circuit device of clauses C7, 8, or 9, comprising:

a first basic block;

a second basic block;

looping logic that loops processing in the first basic block to produce the loop output;

wherein the second basic block comprises validation logic to only receive the loop output upon execution, completion, or both of a last loop of the looping logic;

wherein the data utilization logic comprises an implementation of a loop output; and wherein the toggle rate reduced logic reduces a toggle rate of the implementation of the loop output on the integrated circuit device.

Clause C13. The integrated circuit device of clause C12, wherein the validation logic comprises a data register that is disposed upstream of computation logic of the second basic block, wherein the data register is enabled by a valid signal upon execution, completion, or both of the last loop of the looping logic, such that data may be registered in the data registered and subsequently evaluated by the computation logic, while blocking data from being registered by the data register when not executing, completing, or both the last loop of the looping logic.

Clause C14. The integrated circuit device of clauses C7, 8, 9, or 13, wherein the toggle rate reduced logic reduces a toggle rate of stall-valid logic that implements a stall in the integrated circuit device;
  wherein the toggle rate reduced logic comprises an AND gate;
  wherein the AND gate takes as input an inverted stall out and a valid signal; and
  wherein the AND gate provides an output signal used to selectively enable and disable a data register.

Clause C15. A hardware implemented method, comprising:
  performing, via an integrated circuit device, data processing using a circuitry implementation of a high-level programming design, wherein the circuitry implementation comprises toggle rate reduced logic configured to reduce a toggle rate of the circuitry implementation by blocking unused data from transitioning to downstream evaluation circuitry;
    the toggle rate reduced logic comprising:
      first and second data registers configured to register input data for first and second processing pipelines, respectively, the first and second processing pipelines implemented for an if-then else statement of the high-level design, wherein the first data register is enabled when a condition of the if-then else statement is true and the second data register being enabled when the condition is false;
      a third data register disposed upstream of computation logic of a first basic block that is enabled upon reaching a last iteration of a loop of an upstream basic block that provides its output to be used as an input for the first basic block;
      stall-valid logic circuitry that enables a fourth data register only when a valid signal is asserted and a stall out signal is not asserted; or any combination thereof.

What is claimed is:

1. An integrated circuit device, comprising:
  an upstream data source;
  data utilization logic downstream of the upstream data source; wherein the data utilization logic comprises an implementation of an if-then-else statement; and
  downstream evaluation circuitry of the data utilization logic;
  wherein the data utilization logic comprises toggle rate reduced logic that reduces a toggle rate of the data utilization logic by blocking unused data from transitioning through the data utilization logic to the downstream evaluation circuitry, and
  wherein the toggle rate reduced logic reduces a toggle rate of the implementation of the if-then-else statement on the integrated circuit device.

2. The integrated circuit device of claim 1, comprising:
  a first branch processing pipeline;
  a second branch processing pipeline;
  a first data register that registers input data for the first branch processing pipeline;
  a second data register that registers input data for the second branch processing pipeline;
  wherein the first data register and the second data register are enabled based upon a condition of the if-then-else statement.

3. The integrated circuit device of claim 2, wherein:
  one but not both of the first data register and the second data register are enabled based upon the condition being true; and
  wherein one but not both of the first data register and the second data register are enabled based upon the condition being false.

4. The integrated circuit device of claim 2, wherein:
  the first data register comprises a first stage of registers of the first branch processing pipeline; and
  the second data register comprises a second stage of registers of the second branch processing pipeline.

5. The integrated circuit device of claim 4, wherein:
  the first stage of registers, the second stage of registers, or both are positioned to maximize a reduction of power in the downstream evaluation circuitry of the first branch processing pipeline, the second branch processing pipeline, or both.

6. The integrated circuit device of claim 4, wherein:
  the first stage of registers, the second stage of registers, or both are positioned to minimize an impact of adding an enable line to the first stage of registers.

7. The integrated circuit device of claim 4, wherein:
  the first stage of registers, the second stage of registers, or both are positioned to balance between:
    maximizing a reduction of power in the downstream evaluation circuitry of the first branch processing pipeline, the second branch processing pipeline, or both; and
    minimizing an impact of adding an enable line to the first stage of registers.

8. An integrated circuit device, comprising:
  an upstream data source;
  data utilization logic downstream of the upstream data source, wherein the data utilization logic comprises an implementation of a loop output; and
  downstream evaluation circuitry of the data utilization logic;
  wherein the data utilization logic comprises toggle rate reduced logic that reduces a toggle rate of the data utilization logic by blocking unused data from transitioning through the data utilization logic to the downstream evaluation circuitry, and
  wherein the toggle rate reduced logic reduces a toggle rate of the implementation of the loop output on the integrated circuit device.

9. The integrated circuit device of claim 8, comprising:
  a first basic block;
  a second basic block;
  looping logic that loops processing in the first basic block to produce the loop output;
  wherein the second basic block comprises validation logic to only receive the loop output upon execution, completion, or both of a last loop of the looping logic.

10. The integrated circuit device of claim 9, wherein the validation logic comprises a data register that is disposed upstream of computation logic of the second basic block, wherein the data register is enabled by a valid signal upon execution, completion, or both of the last loop of the looping logic, such that data may be registered in the data register and subsequently evaluated by the computation logic, while blocking data from being registered by the data register when not executing, completing, or both the last loop of the looping logic.

11. An integrated circuit device, comprising:
an upstream data source;
data utilization logic downstream of the upstream data source; and
downstream evaluation circuitry of the data utilization logic;
wherein the data utilization logic comprises toggle rate reduced logic that reduces a toggle rate of the data utilization logic by blocking unused data from transitioning through the data utilization logic to the downstream evaluation circuitry, and wherein the toggle rate reduced logic reduces a toggle rate of stall-valid logic that implements a stall in the integrated circuit device.

12. The integrated circuit device of claim 11, wherein the toggle rate reduced logic comprises an AND gate;
wherein the AND gate takes as input an inverted stall out and a valid signal; and
wherein the AND gate provides an output signal used to selectively enable and disable a data register.

* * * * *